United States Patent
Brunner et al.

(10) Patent No.: US 7,039,368 B2
(45) Date of Patent: May 2, 2006

(54) METHOD FOR CONTROLLING THE FORMATION OF A DOWNLINK BEAM

(75) Inventors: Christopher Brunner, Wittlich (DE); Alexander Seeger, Feldkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 10/296,097

(22) PCT Filed: May 22, 2001

(86) PCT No.: PCT/DE01/01970

§ 371 (c)(1),
(2), (4) Date: Nov. 25, 2002

(87) PCT Pub. No.: WO01/91325

PCT Pub. Date: Nov. 29, 2001

(65) Prior Publication Data
US 2004/0082299 A1    Apr. 29, 2004

(30) Foreign Application Priority Data
May 25, 2000   (DE) .............................. 100 25 987

(51) Int. Cl.
  *H03C 7/02* (2006.01)
(52) U.S. Cl. .................. 455/101; 455/562.1; 455/133
(58) Field of Classification Search ............ 455/552.1, 455/562.1, 553.1, 101, 561, 560, 103; 370/342, 370/252
See application file for complete search history.

(56) References Cited

U.S. PATENT DOCUMENTS

| 5,561,850 | A | | 10/1996 | Mäkitalo et al. |
| 5,652,764 | A | * | 7/1997 | Kanzaki et al. ............. 375/130 |
| 6,317,586 | B1 | * | 11/2001 | Haardt .................... 455/67.16 |
| 6,430,399 | B1 | * | 8/2002 | Niemela .................. 455/67.16 |
| 6,489,923 | B1 | * | 12/2002 | Bevan et al. ............... 342/378 |
| 6,597,678 | B1 | * | 7/2003 | Kuwahara et al. .......... 370/342 |
| 6,671,499 | B1 | * | 12/2003 | Ylitalo et al. ............... 455/101 |
| 2004/0235527 | A1 | * | 11/2004 | Reudink et al. ............ 455/561 |
| 2004/0259597 | A1 | * | 12/2004 | Gothard et al. .......... 455/562.1 |

FOREIGN PATENT DOCUMENTS

DE           198 03 188 A1     7/1999

(Continued)

OTHER PUBLICATIONS

3GPP TS 25.211, Technical Specification, "3rd Generation Partnership Project; Technical Specification Group Radio Access Network; Physical Channels and Mapping of Transport Channels onto Physical Channels (FDD) (release 1999)", v3.4.0 (Sep. 2000), pp. 1-43.

(Continued)

*Primary Examiner*—Tilahun Gesesse
(74) *Attorney, Agent, or Firm*—Staas & Halsey LLP

(57) ABSTRACT

A method controls the downlink beam in a radio communication system. The radio communication system has an antenna system with several antenna elements. The method involves a) examining a received uplink signal sent by a transmitter for the existence of phase correlations between parts of the uplink signal received from various antenna elements of the antenna system, and b) if a phase correlation is detected, assigning at least one source direction to the uplink signal and sending the downlink signal in the source direction. If a phase correlation is not detected, however, the downlink signal is sent in a non-directional manner in the form of several components produced using at least one diversity technique.

16 Claims, 3 Drawing Sheets

FOREIGN PATENT DOCUMENTS

| | | |
|---|---|---|
| EP | 0 817 308 A2 | 1/1998 |
| WO | WO 98/27669 | 6/1998 |
| WO | WO 99/35764 | 7/1999 |

OTHER PUBLICATIONS

Raitola et al., "Transmission Diversity in Wideband CDMA", IEEE, 1999, pp. 1545-1549.

Paulraj et al., "Space-Time Processing for Wireless Communications", IEEE Signal Processing Magazine, pp. 49-83, Nov. 1997.

Schmalenberger et al., "A Comparison of Two Different Algorithms for Multi Antenna C/I Balancing", Sep. 1997, pp. 483-490.

* cited by examiner

Related Art

METHOD FOR CONTROLLING THE FORMATION OF A DOWNLINK BEAM

CROSS REFERENCE TO RELATED APPLICATIONS

This application is based on and hereby claims priority to PCT Application No. PCT/DE01/01970 filed on 22 May 2001 and German Application No. 100 25 987.1 filed on 25 May 2000, the contents of which are hereby incorporated by reference.

BACKGROUND OF THE INVENTION

The invention relates to a method for controlling downlink beamforming in a radio communications system having an antenna device which comprises a number of antenna elements.

In radio communications systems, messages (speech, picture information or other data) are transmitted via transmission channels by electromagnetic waves (radio interface). The transmission process takes place both in the downlink direction from a base station to a subscriber station and in the uplink direction from the subscriber station to the base station.

Signals which are transmitted using electromagnetic waves are subject to disturbances from interference, inter alia, during their propagation in a propagation medium. Disturbances by noise may be caused, inter alia, by noise in the input stage of the receiver. Diffraction and reflections result in signal components passing through different propagation paths. Firstly, this means that a signal at the receiver is often a mixture of a number of contributions which, although they come from the same transmitted signal, they may, however, reach the receiver more than once, in each case from different directions, with different delays, attenuations and phase angles. Secondly, contributions to the received signals which are coherent but have different phase relationships may interfere with each other in the receiver, where they lead to cancellation effects over a short time scale (fast fading).

There are two classes of methods for combating transmission disturbances and/or interruptions caused by fast fading, by using antenna devices having a number of elements.

The first group is based on diversity techniques which, in simple terms, means that the downlink signal is transmitted at the same time on different channels, in the expectation that it will be possible to receive at least one of these channels at the subscriber station. Various diversity techniques are known, for example code diversity (code division transmission diversity (CDTD which is also referred to as orthogonal transmit diversity (OTD)), "time switched transmission diversity" (time switch transmission diversity TSTD) or selection transmission diversity (STD). These techniques are described, for example, in Raitola et al., Transmission Diversity in Whiteband CDMA, Proceedings of 49th IEEE Vehicular Technology Conference (VTC'99—Spring) Houston, Tex. Transmission using code diversity based on space time block codes as well as TSTD has also been mentioned in the specifications for the Third Generation Partnership Project for 3rd generation mobile radio networks, see 3GTS 25.211 Version 3.1.1 (Technical Specification Group Radio Access Network: Physical Channels and Mapping of Transport Channels onto Physical Channels (FDD), Version 3.1.0, December 1999).

Code diversity means that each antenna element in the antenna device transmits the same user data sequence, but in each case codes it using a different orthogonal code. In this case, in particular, the use of space time block codes for coding ensures that the contributions of different antenna elements to the downlink signal cannot cancel one another out at the receiver location. Self-cancellation of an individual contribution is, however, not precluded.

In TSTD, the downlink signal is in each case transmitted by different antenna elements in the antenna device at different times in accordance with a predetermined pattern.

These diversity techniques have the common feature that there is no feedback on the quality of the contribution of the individual antenna elements at the receiver, and that, therefore, the transmission power must be distributed virtually "blind" between the individual antenna elements at the transmitter. Thus, to a certain extent, these techniques follow a strategy of risk scattering: since the transmitter end does not know which of a number of available codes or which antenna element allows the best transmission at a given point in time, a number of codes or a number of antenna elements are used at the same time, or changed over rapidly, in the expectation that, on average, a usable transmission quality will be achieved, even if this is not the optimum.

In the case of selection transmission diversity (STD), as likewise described in Raitola and in other references, backward and forward switching between the transmitter antenna elements is carried out on the basis of feedback about the reception quality from the receiver to the transmitter. This technique makes it possible to specifically avoid the use of antenna elements which do not allow satisfactory transmission at a given point in time, and reduce the overall mean transmission power level of the transmitter.

If the transmission channel is changing only slowly, it is also possible for the receiver to determine weighting vectors, by which the contributions to the downlink signal transmitted by the individual antenna elements should be averaged at the transmitter end, in order to result in an optimum signal-to-disturbance ratio, and transmit these weighting values to the transmitter.

All these approaches have the common feature that they are feasible only for antenna devices with a maximum of two antenna elements. Specifically, if weighting vectors must be determined and must be transmitted to the transmitter, the bandwidth required to do this increases with the number of antenna elements; the bandwidth actually available for such a transmission is, however, tightly constrained. Control by weighting vectors that are transmitted in the opposite direction thus becomes more cumbersome the greater the number of antenna elements that are involved. In the case of diversity techniques such as OTD, TSTD, a diversity gain is admittedly achieved by using additional antenna elements; however, this gain is considerably less when changing from two to four antenna elements than when changing from one antenna element to two, that is to say the advantages which can be achieved by increasing the number of antenna elements are low in relationship to the complexity. Furthermore, these approaches do not offer any solution to the problem of the disturbance with individual receivers in a radio communications system resulting from downlink signals intended for other receivers.

One solution to this problem is achieved by beamforming methods. DE 198 03188 A1 may be cited as an example of a method such as this. This document discloses a method in which a three-dimensional covariance matrix is defined for a link from a base station to a subscriber station. An eigen vector is calculated from the covariance matrix in the base station, and is used as a beamforming vector for that link. The transmitted signals for that link are weighted with the beamforming vector, and are supplied to antenna elements for transmission.

Quite clearly, in an environment with multipath propagation, this method determines a propagation path with good transmission characteristics, and physically concentrates the transmission power of the base station on this propagation path.

However, this cannot prevent interference on this transmission path from briefly being able to lead to signal cancellation and thus to interruptions in the transmission.

With this method, directional transmission of the downlink signal makes it possible to considerably reduce disturbances with other receivers resulting from a downlink signal that is not intended for them. However, it is impossible to prevent interference on the directional propagation path from leading briefly to signal cancellation and thus to interruptions in the transmission. Furthermore, the method relies on the capability to associate a source direction with the uplink signal, in order to make it possible to transmit the downlink signal specifically in this source direction. However, this is not always possible. Especially in microcells, for example within buildings, multiple reflections may make it impossible to associate an uplink signal with one source direction. In an environment such as this, beamforming does not allow any better transmission qualities to be achieved than nondirectional transmission.

SUMMARY OF THE INVENTION

A potential object of the invention is to specify a method which allows a transmitter in a radio communications system to control a downlink beam in a manner which is in each case matched to the current transmission and reception situation.

The method can be carried out in a base station in a radio communications system which has an antenna device with a number of antenna elements. The method comprises the steps of investigation of a received uplink signal coming from a subscriber station for the existence of phase correlation between components of the uplink signal received by different antenna elements in the antenna device, and of controlling the downlink beam as a function of the result of this investigation. If phase correlation is established, the uplink signal is associated with at least one source direction, and the downlink signal is transmitted directionally in this source direction. If it is established that no phase correlation exists, the downlink signal is transmitted nondirectionally in the form of a number of contributions, which are produced using at least one diversity technique. This diversity technique may be selected from a large number of different possible techniques, such as time diversity, antenna diversity, code diversity and frequency diversity.

If, when phase correlation exists, the existence of a direct transmission path for the uplink signal is also determined, the downlink signal is expediently transmitted exclusively in the direction of this uplink signal. In this case, only a signal transmission path is used for the downlink signal, although this is acceptable owing to the low susceptibility of the direct transmission path to fast fading, and allows effective utilization of the available transmission channels by the base station.

The existence of a direct transmission path can preferably be identified for the base station from the lack of variation with time in that contribution of the uplink signal which reaches the base station with the shortest delay time.

If no such direct transmission path exists, it is, in contrast, expedient to determine a number of source directions for the uplink signal and to transmit the downlink signal directionally in this number of directions, so that, in this case, any possible cancellation on a transmission path cannot lead to interruption of reception by the subscriber station.

When investigating the uplink signal for the existence of phase correlation, an averaged three-dimensional covariance matrix of the components of the uplink signal is expediently produced, and it is assumed that no phase correlation exists if the averaged covariance matrix is essentially diagonal. In this case, an essentially diagonal matrix occurs, in particular, when the nondiagonal coefficients of the matrix are of the same order of magnitude as the measurement accuracy of the method which is used to produce the covariance matrix.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
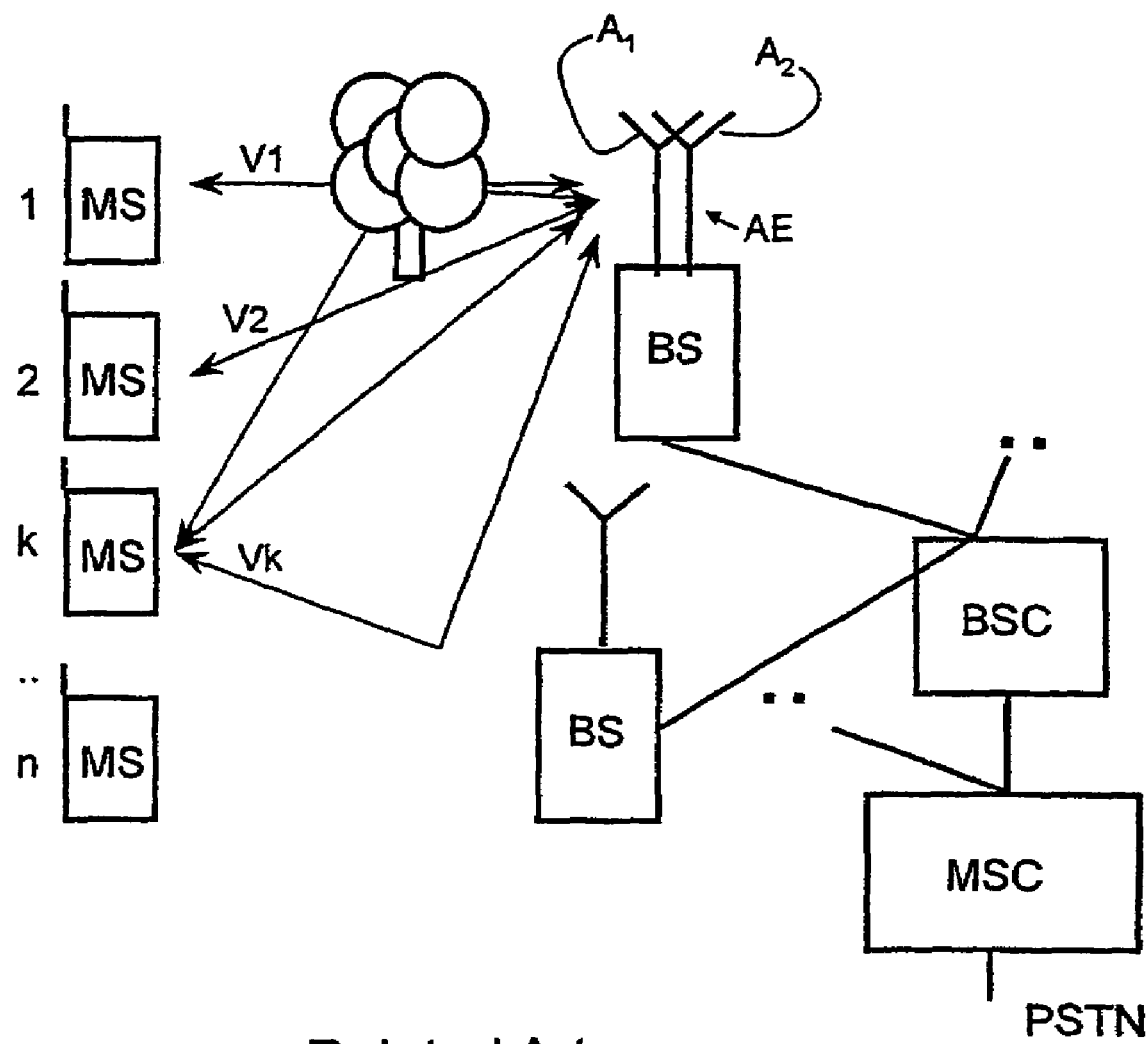
FIG. 1 shows a block diagram of a mobile radio network.

Reference will now be made in detail to the preferred embodiments of the present invention, examples of which are illustrated in the accompanying drawings, wherein like reference numerals refer to like elements throughout.

FIG. 1 shows the structure of a radio communications system in which the method can be used. This comprises a large number of mobile switching centers MSC, which are networked with one another and allow access to a landline network PSTN. Furthermore, these mobile switching centers MSC are connected to in each case at least one base station controller BSC. Each base station controller BSC in turn allows a connection for at least one base station BS. A base station BS such as this may set up a message link to the subscriber stations MS via a radio interface. At least individual ones of the base stations BS are equipped with antenna devices AE, which have a number of antenna elements ($A_1$–$A_M$), for this purpose.

By way of example, FIG. 1 shows connections V1, V2, . . . , Vk for transmitting user information and signaling information between subscriber stations MS1, MS2, . . . , MSk, . . . , MSn and a base station BS. Different transmission paths for the link $V_k$ are symbolized by arrows between the base station BS and the subscriber station MSk. An operation and maintenance center OMC provides monitoring and maintenance functions for the mobile radio network, or for parts of it. The functionality of this structure can be transferred to other radio communications systems, in particular for subscriber access networks with wire-free subscriber access.

Figure 2:
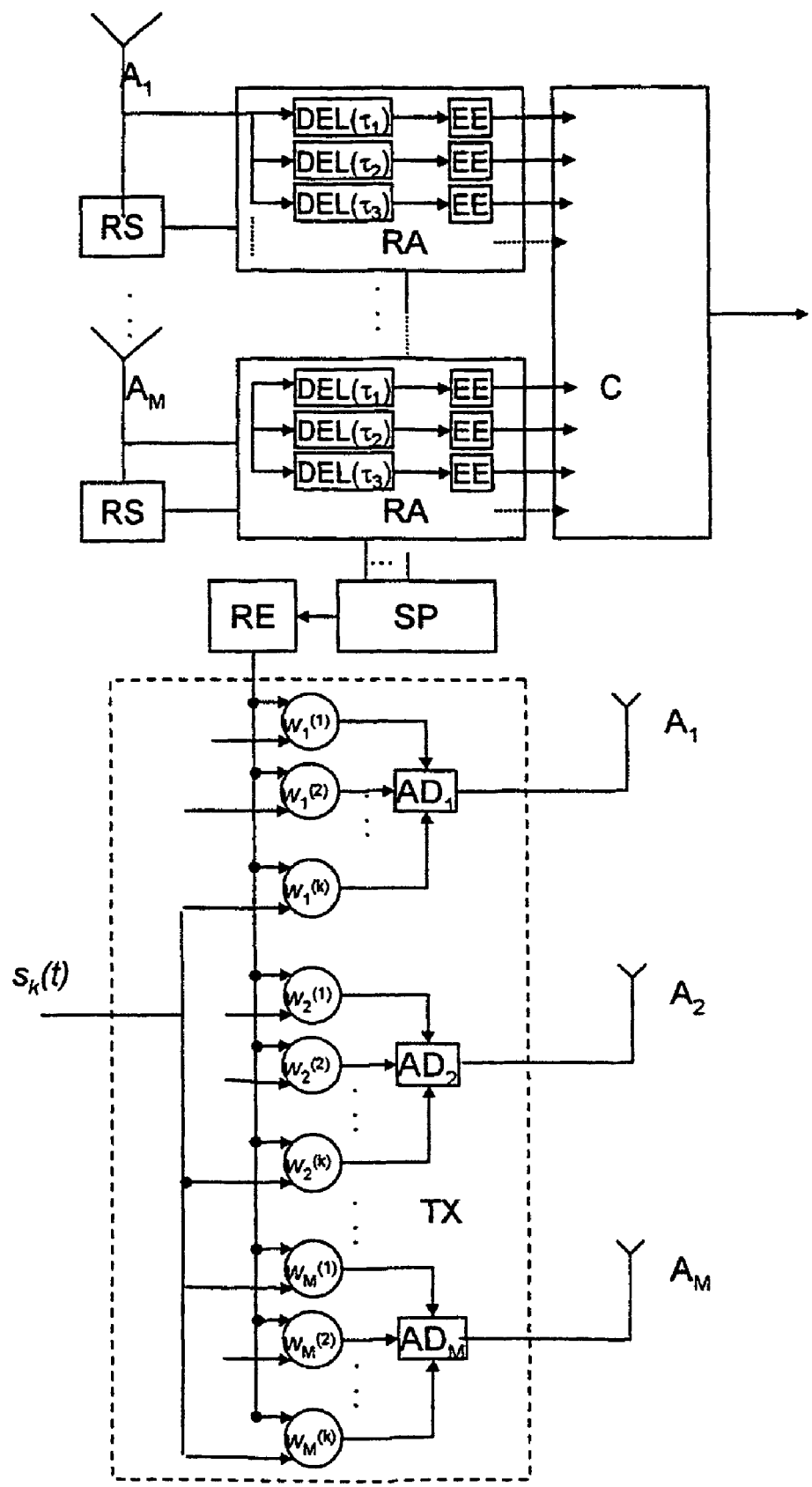
FIG. 2 shows a block diagram of the base station.

FIG. 2 shows, schematically, the design of the receiving section of a base station BS for carrying out the method. The base station BS has an antenna device AE with a number of antenna elements $A_1$, $A_2$, . . . , $A_M$, which receive the uplink signal which is transmitted by the subscriber station MSk. The signal received by each antenna element is converted to baseband and is supplied to a so-called rake searcher RS, which is used to measure delay time differences between contributions to the uplink signal which have reached the antenna element on different propagation paths. The received signal is furthermore applied to a rake amplifier RA, which has a number of rake fingers, three of which are shown in the figure, and which each have a delay element DEL and a despreader-descrambler EE. The delay elements DEL each delay the received signal by a delay value $\tau_1$, $\tau_2$, $\tau_3$ . . . which is supplied from the rake searcher RS. The despreader-descramblers EE each produce a sequence of estimated symbols at their outputs, in which case the results of the estimation process for the individual descramblers may be different to the descrambling and spreading code in the individual fingers of the rake amplifier as a result of different phase angles in the downlink signal.

The symbol sequences which are supplied from the despreader-descramblers EE form input signals to a combiner C, which collates the large number of symbol sequences to form an estimated symbol sequence.

The symbol sequences supplied from the despreader-descramblers EE also contain the results of the estimation of training sequences, which are transmitted by the subscriber stations MS1, MS2, . . . , MSk, . . . , MSn, and which are quasi-orthogonal and are characteristic of the individual subscriber stations. A signal processor SP is used to compare the results of the estimation of these training sequences with the symbols of the training sequences which are known to the base station and are actually transmitted by the subscriber stations. Since this comparison is carried out in each case individually for each finger of the rake amplifier RA, that is to say for each delay or each tap found by the rake searcher RS, the impulse response of the transmission channel between the base station BS and the subscriber station MSk can be obtained individually for each antenna element $A_1, A_2, \ldots, A_M$ and for each tap. For each tap, the signal processor SP collates the impulse responses of all the antenna elements $A_1, \ldots, A_M$ in the manner known, for example, from the cited DE 198 03 188 to form a three-dimensional covariance matrix $R_{xx}$.

Figure 3:
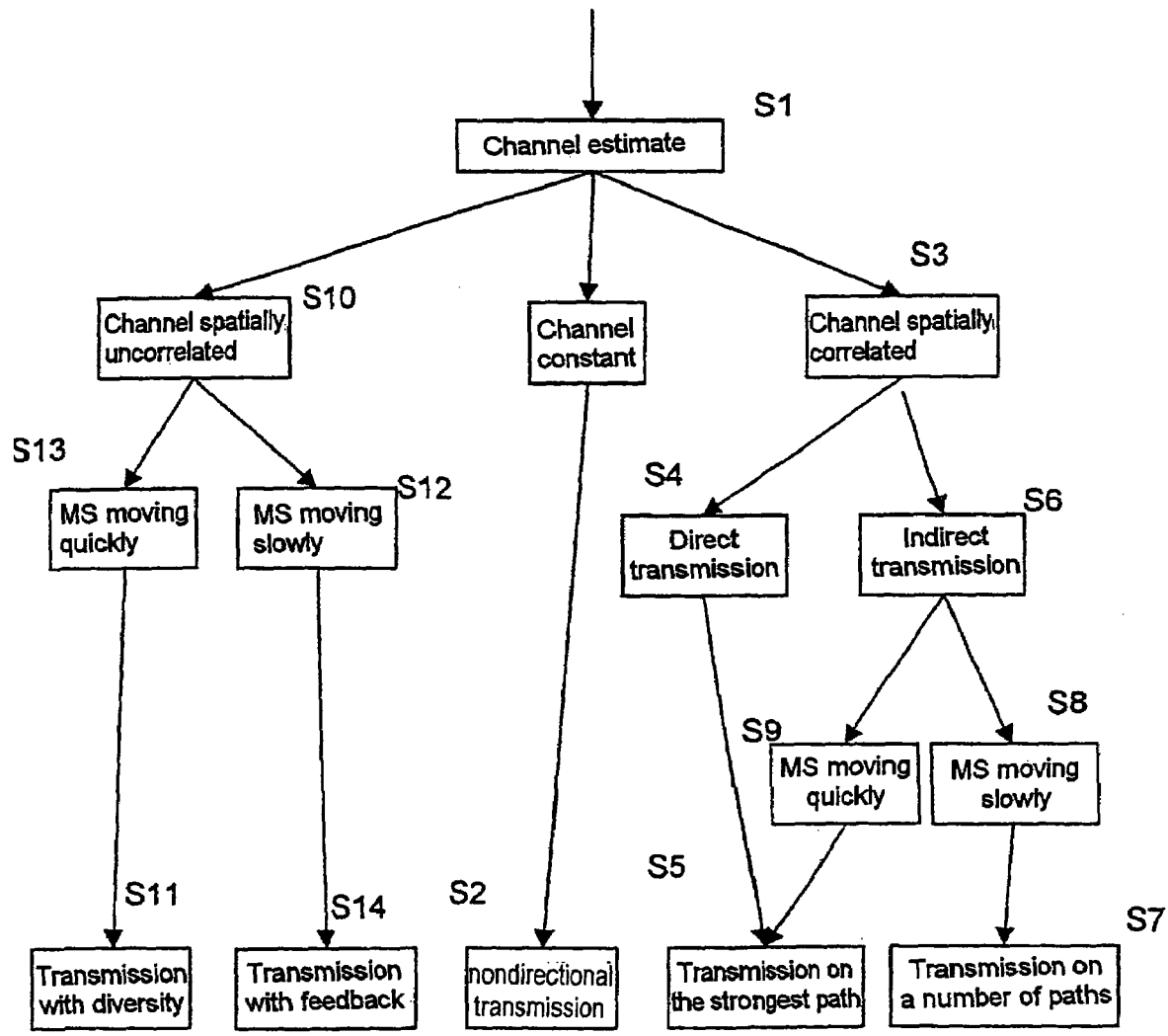
FIG. 3 shows a diagram of the method according to one aspect of the invention.

The evaluation of the covariance matrices $R_{xx}$ obtained in this way by a control unit SE will be explained in more detail with reference to the diagram in FIG. 3. The control unit SE first of all forms a mean value $\overline{R}_{xx}$ of a large number of successively produced covariance matrices $R_{xx}$, in order to average out the influences of fast fading on the channel. Furthermore, fluctuation widths are determined for coefficients of the covariance matrices (section S1, channel estimation). If these fluctuation widths are narrower than a limit value which can be defined in an appropriate manner, that is to say the transmission channel does not change over the course of time, than this is an indication that the subscriber stations as well as reflectors, on which the uplink signal which is transmitted by the subscriber station is reflected on its path to the base station, are not moving. In a case such as this, it is impossible to average out fast fading, and the form of the covariance matrix does not allow any conclusions to be drawn about channel characteristics such as the source direction of the uplink signal, mean attenuation, etc.

This result is passed from the control unit SE to the transmitting section TX (FIG. 2) of the base station, in order to initiate nondirectional transmission of the downlink signal (step S2). Since the transmission channel varies only slowly, it is possible in this case for the subscriber station MSk to identify the contributions of the individual antenna elements in the downlink signal received by it, and to calculate a weighting vector $w^{(k)}$ for the antenna elements, which allow the signal to be received in the optimum manner, by transmitting this weighting vector $w^{(k)}$ to the base station, and by the base station multiplying the downlink signal $S_k(t)$, before transmission by an antenna element, by that coefficient $w_i^{(k)}$, i=1, . . . , M of the weighting vector which is associated with this antenna element $A_i$.

If the investigation of the fluctuation width of the coefficients of the covariance matrix $\overline{R}_{xx}$ by the control unit SE shows that the transmission channel is not constant, then the control unit SE decides whether any source direction can be associated with the received uplink signal. This is possible whenever there is a phase relationship between uplink signals received by different antenna elements in the base station, that is to say if the covariance matrix $\overline{R}_{xx}$ has components which do not disappear away from the diagonals. The information about the source direction of the uplink signal is contained in the eigen vectors of the covariance matrix $\overline{R}_{xx}$; its coefficients indicate the relative phase angles with which a coherent uplink signal reaches the individual antenna elements.

If a phase relationship exists between the uplink signals arriving at the individual antenna elements, in other words, if the channel is spatially correlated (step S3), and the control unit SE identifies this from the nondiagonal elements of the covariance matrix $\overline{R}_{xx}$, then, in consequence, it determines whether there is a direct transmission link between the base station and the subscriber station. A direct transmission path such as this is always the shortest possible transmission path and, in consequence, if the received uplink signal has a number of contributions arriving at different times to one another, only the earliest can correspond to a direct transmission link. If, furthermore, this earliest contribution is distinguished by having a constant amplitude, the control unit SE uses this to identify that a direct transmission path exists (step S4) and initiates directional transmission of the downlink signal in the source direction which corresponds to the direct transmission path (step S5). If the uplink and downlink use the same frequencies, it is sufficient for such beamforming of the downlink beam to weight those contributions of the downlink signal which are to be transmitted by the individual antenna elements using the coefficients of that eigen vector $w^{(k)}$ which corresponds to this transmission path. If the frequencies of the uplink and downlink differ, the phases of the components of this eigen vector can be converted, in the manner with which those skilled in the art are familiar, to delay time differences, which are in turn converted on the basis of the downlink frequency to phase differences in order in this way to obtain a weighting vector $w^{(k)}$ for the beamforming for the downlink beam.

If no direct transmission link is established between the base station and the subscriber station (step S6), that is to say the existing transmission paths contain at least one reflection, then there is a risk of one of these transmission paths failing briefly due to fast fading. This problem is overcome by the control unit SE in such a case determining not only a single eigen vector $w^{(k)}$ for the covariance matrix but, from the totality of the eigen vectors of the covariance matrix, by selecting those which have the greatest eigen values. These eigen vectors correspond to the transmission paths with the least attenuation. The risk of a transmission interruption is minimized by simultaneous transmission of the downlink signal in the source directions of at least two of these transmission paths (step S7).

When no direct transmission path exists, a further development also allows the control unit SE to differentiate on the basis of the speed at which the subscriber station is moving relative to the base station. If this speed is very high, then this leads to inherent time diversity, since the subscriber station is in each case located only very briefly at points at which destructive interference takes place in the downlink signal, and reception interruptions resulting from this can be compensated for by error correction. The control unit is able to estimate the speed of movement of the subscriber station on the basis of the rate at which the eigen vectors of the averaged three-dimensional covariance matrix change. If this rate remains below a given limit value, that is to say the subscriber station is moving slowly (step S8), the downlink beam is transmitted simultaneously on a number of transmission paths (step S7) while, if the subscriber station speed is higher (step S9), it is transmitted only in the direction of the transmission path with the least attenuation (step S5).

If the channel is found to be spatially uncorrelated (step S10), no improvement in the transmission quality can be achieved by beamforming supported by the averaged three-dimensional covariance. In a case such as this, on the basis of a simpler refinement of the method, the control unit initiates the transmission of the downlink signal using one or more diversity techniques such as OTD, TSTD or STD (step S11).

One development of the method additionally makes it possible to distinguish between fast and slowly moving subscriber stations, in which case the use of the diversity techniques (step S11) is still restricted to fast moving subscriber stations (step S13). In the case of a slowly moving subscriber station (step S12), for which the characteristics of the transmission channel also change slowly, as in the situation already dealt with above in which the channel does not change, the downlink signal is preferably transmitted using weighting vectors (step S14) which are optimized by feedback from the subscriber station. This allows directional transmission of the downlink signal even in situations where the uplink signal at any time, or at least most of the time, has a source direction which, however, is varying so quickly that it can no longer be identified in the averaged covariance matrix $\overline{R}_{xx}$.

The invention has been described in detail with particular reference to preferred embodiments thereof and examples, but it will be understood that variations and modifications can be effected within the spirit and scope of the invention.

What is claimed is:

1. A method for controlling a downlink beam in a radio communications system having an antenna device which has a number of antenna elements, comprising:
   investigating a received uplink signal from a transmitter for the existence of phase correlation between components of the uplink signal received by different antenna elements in the antenna device, and
   if phase correlation exists, associating at least one source direction with the uplink signal and transmitting the downlink signal directionally in the source direction, and
   if no phase correlation exists, transmitting the downlink signal non-directionally in the form of a number of contributions produced using at least one diversity technique.

2. The method as claimed in claim 1, wherein, for a transmission channel having constant transmission properties, the downlink signal is transmitted non-directionally in the form of a number of contributions which are produced using at least one diversity technique.

3. The method as claimed in claim 2, wherein
   for a transmission channel having constant transmission properties or a transmission channel having slowly changing transmission properties, information is transmitted in the uplink signal using relative transmission power levels for uplink components,
   the relative transmission power levels are used to transmit the contributions of the downlink signal.

4. The method as claimed in claim 1, wherein the diversity technique is chosen from time diversity, antenna diversity, code diversity and frequency diversity.

5. The method as claimed in claim 4 wherein the diversity technique is chosen from time diversity, antenna diversity, code diversity and frequency diversity.

6. The method as claimed in claim 5, wherein
   for a constant transmission channel having constant transmission properties or a transmission channel having slowly changing transmission properties, information is transmitted in the uplink signal using relative transmission power levels for uplink components,
   the relative transmission power levels are used to transmit the contributions of the downlink signal.

7. The method as claimed in claim 6, wherein, if phase correlation exists, and if a direct transmission path exists for the uplink signal, a single source direction is determined for the uplink signal, and the downlink signal is transmitted only in the single source direction.

8. The method as claimed in claim 7, wherein existence of the direct transmission path is established when a first component of the uplink signal in time has an amplitude that does not vary with time.

9. The method as claimed in claim 8, wherein, if phase correlation exists but no direct transmission path exists for the uplink signal, a number of source directions are determined for the uplink signal, and the downlink signal is transmitted directionally in each of the number of source directions.

10. The method as claimed in claim 9, wherein
    the rate of change of the source directions is recorded, and
    the downlink signal is transmitted only in the source direction of a strongest component in the uplink signal, when the rate exceeds a limit value.

11. The method as claimed in claim 1, wherein
    to investigate the uplink signal for the existence of phase correlation, an averaged covariance matrix is produced for the components of the uplink signal, and
    it is assumed that no phase correlation exists if the averaged covariance matrix is essentially diagonal.

12. The method as claimed in claim 1, wherein, if phase correlation exists, and if a direct transmission path exists for the uplink signal, a single source direction is determined for the uplink signal, and the downlink signal is transmitted only in the single source direction.

13. The method as claimed in claim 12, wherein existence of the direct transmission path is established when a first component of the uplink signal in time has an amplitude that does not vary with time.

14. The method as claimed in claim 1, wherein, if phase correlation exists but no direct transmission path exists for the uplink signal, a number of source directions are determined for the uplink signal, and the downlink signal is transmitted directionally in each of the number of source directions.

15. The method as claimed in claim 14, wherein
    the rate of change of the source directions is recorded, and
    the downlink signal is transmitted only in the source direction of a strongest component in the uplink signal, when the rate exceeds a limit value.

16. The method as claimed in claim 1, wherein to investigate the uplink signal for the existence of phase correlation, an averaged covariance matrix is produced for the components of the uplink signal, and it is assumed that no phase correlation exists if the averaged covariance matrix is essentially diagonal.

* * * * *